United States Patent [19]

Carson

[11] Patent Number: 4,893,586

[45] Date of Patent: Jan. 16, 1990

[54] SLEEPING BAG FOR PETS

[76] Inventor: Betty J. Carson, P.O. Box 989, Canyonville, Oreg. 97417

[21] Appl. No.: 199,140

[22] Filed: May 26, 1988

[51] Int. Cl.⁴ .............................................. A01K 1/035
[52] U.S. Cl. .......................................... 119/1; 119/15
[58] Field of Search ................... 119/15, 1, 19; 2/69.5; 5/413

[56]  References Cited

U.S. PATENT DOCUMENTS

| | | | |
|---|---|---|---|
| 1,653,815 | 12/1927 | Millar | 5/413 |
| 2,032,248 | 2/1936 | Bins | 119/1 |
| 2,775,222 | 12/1956 | Kruck | 119/1 |
| 2,830,606 | 4/1958 | Daugherty | 119/15 |
| 2,854,948 | 10/1958 | Drayson | 119/1 |
| 3,842,454 | 10/1974 | Young | 119/1 |
| 3,989,008 | 11/1976 | Neumann | 119/1 |
| 4,008,687 | 2/1977 | Keys | 119/1 |
| 4,169,428 | 10/1979 | Waugh | 119/1 |
| 4,534,065 | 8/1985 | Comfort | 2/69.5 |
| 4,729,343 | 3/1988 | Evans | 119/15 |

*Primary Examiner*—Robert P. Swiatek
*Assistant Examiner*—Nicholas D. Lucchesi
*Attorney, Agent, or Firm*—James D. Givnan, Jr.

[57] ABSTRACT

A fabric bag having top and bottom members sewn about their perimeters to one another. Rolled and stitched edges of the two members define a permanent opening for entry of a pet. A tunnel is formed in the bag by the uppermost rolled and stitched edge in conjunction with pleats in the top members. Grommets permit bag securement to a ground surface.

1 Claim, 1 Drawing Sheet

U.S. Patent
Jan. 16, 1990
4,893,586
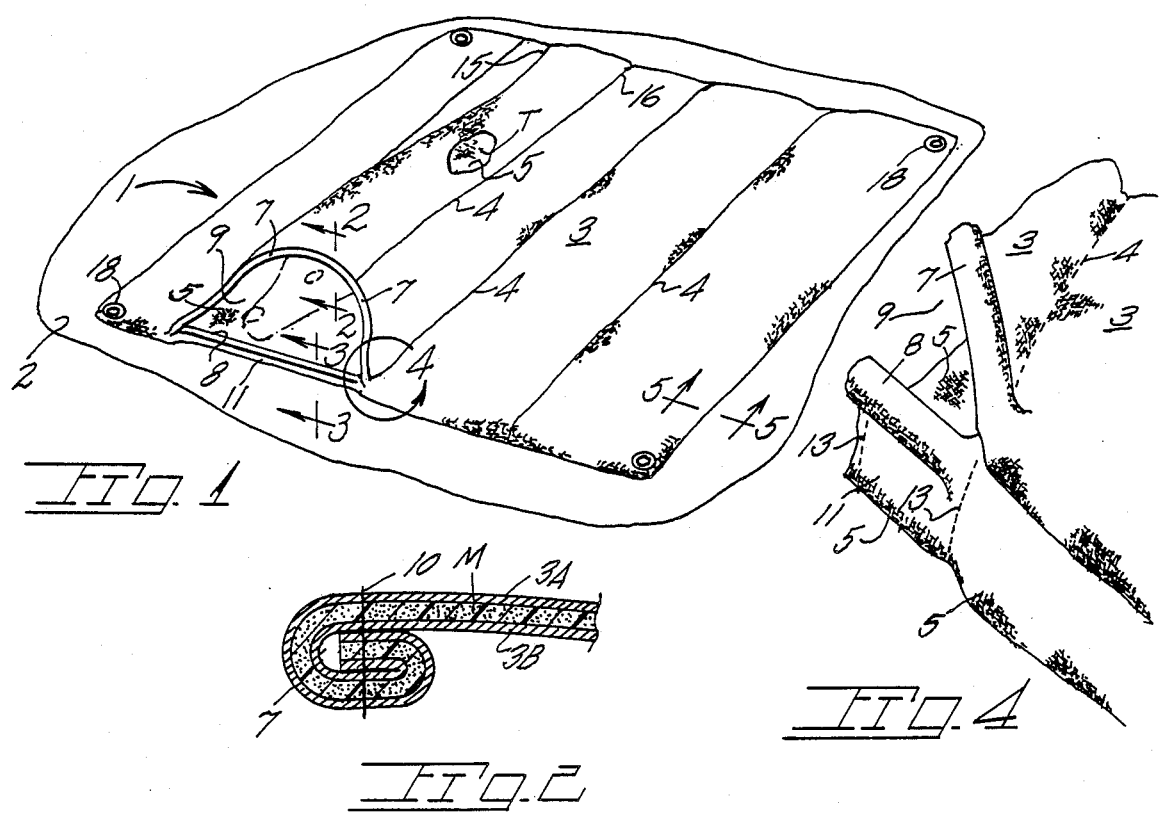
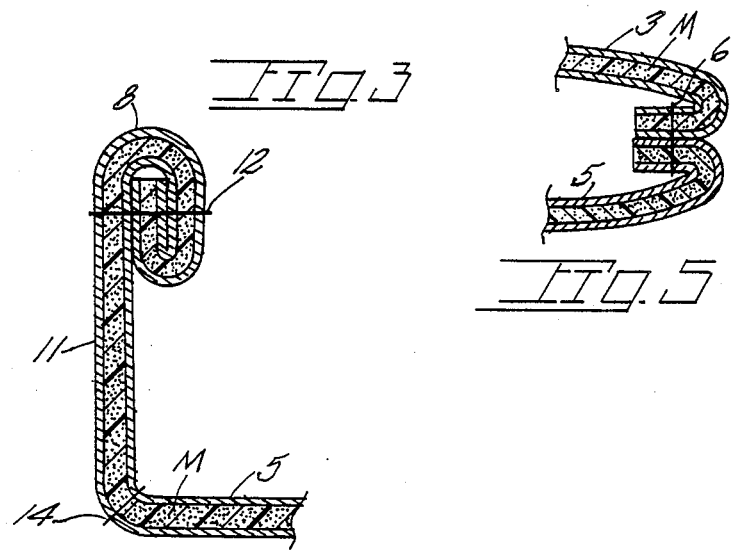

SLEEPING BAG FOR PETS

BACKGROUND OF THE INVENTION

The present invention pertains generally to a portable pet shelter of sewn construction.

Individuals enaged in outdoor activities such as hunting, camping, hiking, etc., frequently desire to take a pet along on the outing but are prevented from doing so by the obstacle of providing adequate shelter for same. Another problem encountered by pet owners is providing adequate warmth to permit the pet to remain out-of-doors during the winter months. Rigid shelters are obviously highly inconvenient when traveling with a pet.

Various solutions have been proposed including U.S. Pat. No. 3,989,008 which shows an animal shelter of fabric construction wherein ingress and egress is permitted by an arch defined opening formed by a flexible or spring steel strip. The size of the opening is adjustable upon raising or lowering of the metal component. Such metal component in the pet sleeping bag prevents same from being machine laundered. Further, the manufacture of such a shelter entails considerable effort as the metal component is apparently confined within a sleeve-like enclosure.

SUMMARY OF THE PRESENT INVENTION

The present invention is embodied within a pet sleeping bag structure which utilizes stitched components to provide a permanent opening for entry and exit of the animal.

A threshold component of the structure facilitates entry of the pet by preventing bag slippage along the ground or floor in response to being contacted by the pet. The present sleeping bag structure is shaped so as to appeal to the pets natural tendency to crawl or "burrow" into a shelter. Both dogs and cats are, for the most part, attracted to protective shelters into which they enter by crawling. The top member of the sleeping bag includes additional fabric to partially define a tunnel into which the animal enters via an arch defined opening. As the arch defined opening is permanent, the animal is at all times provided an exit from the bag structure to avoid risk of suffocation. The bag opening is defined by a rolled edge which provides a degree of rigidity to provide a cantilever arch not dependent on metal or plastic components to retain its shape. Further, an upstanding strip of fabric at the bag entrance engages the back of an animal's front foot to retain the bag in place against slippage during entry of the animal.

Important objectives include the provision of a pet sleeping bag constructed from fabric having a permanent arch to define an entryway with a raised upper member of the bag forming a tunnel; the provision of a pet sleeping bag which is highly portable by reason of having no rigid components and hence may be rolled up; the provision of a pet sleeping bag which may be secured in place to a ground surface.

BRIEF DESCRIPTION OF THE DRAWINGS

In the accompanying drawings:

FIG. 1 is a perspective view of the present sleeping bag for a pet;

FIGS. 2 and 3 are schematic vertical sectional views taken respectively along lines 2—2 and 3—3 of FIG. 1;

FIG. 4 is an enlarged detailed view of that portion of the sleeping bag encircled at 4 in FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates generally the present pet sleeping bag in place on a ground or floor surface 2. The sleeping bag provides a pet shelter for use both indoors and outdoors.

A top member 3 may be of quilted construction with front to rear lines of stitching as at 4. Stitching 4 serves to define tubular areas of the top member into which suitable insulative material M is bonded. Said top member is formed from outer and inner sheets of material at 3A and 3B stitched at 4 to one another. Bottom member 5 may be similarly formed. Additional stitching 6 extends substantially about the perimeter of the sleeping bag to join the top member 3 to a bottom member 5 of like size. For the sake of appearance, the seam about and joining the perimeters of the top and bottom members may be a reversed seam to conceal stitching 6 from view.

Top and bottom edge segments 7 and 8 of said top and bottom members are at all times spaced from one another to define an opening 9 for ingress and egress of the pet. Top edge segment 7 is embodied in a rolled seam stitched at 10 which provides a semi-rigid arch which has an inherent tendency to return to an elevated position even after being accidentally stepped on by the pet. The top edge segment is rolled and tightly stitched at 10 per schematic FIG. 2.

With reference to FIG. 3, an upright threshold member at 11 terminates upwardly in a rolled seam tightly stitched at 12. Accordingly, upright threshold member 11 is provided with a semirigid upper extremity constituting the aforementioned bottom edge segment 8. Threshold member 11 projects upwardly from the main portion of bottom member 5 with stitching at 13 which passes through upright member 11 and through bottom member 5 of the sleeping bag adjacent the lateral extremities of opening 9. Accordingly, stitching 13 serves to lift a forward portion of bottom member 5 upwardly to an upright position to provide a threshold over which a pet steps when entering the sleeping bag. Said upright member engages the back of the animal's lower leg as the pet forces its way into the open area 9. A line of stitching 14 contributes to formation of a corner between upright member 11 and the remaining portion of bottom member 5 of the sleeping bag. Top member 3 is pleated at 15 and 16 i.e., folded under itself prior to being stitched by perimeter stitching 6. A tunnel T is, in effect, provided for the pet. Grommets at 18 are for reception of stakes when the bag is used out-of-doors.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A sleeping bag for household pets, said sleeping bag comprising,
   a fabric top member and a fabric bottom member having generally corresponding perimetrical edges, said top member being of quilted construction, stitching extending along the perimetrical edges to join the top and bottom members, spaced apart top and bottom segments of said perimetrical edges defining an opening for ingress and egress of a pet with the top segment having a rolled and stitched edge to provide a degree of rigidity to same to provide an arch, and said top member being folded at intervals along one of said edges to provide pleats in the top member contributing to the formation of tunnel extending substantially the length of the top member and accessible through said arch into which the pet may crawl.

* * * * *